United States Patent
Kawaguchi et al.

(10) Patent No.: US 7,594,759 B2
(45) Date of Patent: Sep. 29, 2009

(54) OBLIQUE CONTACT DOUBLE ROW BALL BEARING AND METHOD OF IMPARTING PRELOAD IN THE BALL BEARING

(75) Inventors: Toshihiro Kawaguchi, Osaka (JP); Kiyoshi Ogino, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 297 days.

(21) Appl. No.: 10/590,253

(22) PCT Filed: Feb. 21, 2005

(86) PCT No.: PCT/JP2005/002707

§ 371 (c)(1),
(2), (4) Date: Aug. 17, 2006

(87) PCT Pub. No.: WO2005/080809

PCT Pub. Date: Sep. 1, 2005

(65) Prior Publication Data

US 2007/0172166 A1    Jul. 26, 2007

(30) Foreign Application Priority Data

Feb. 23, 2004    (JP)    ............................. 2004-046947

(51) Int. Cl.
- *F16C 19/08* (2006.01)
- *F16C 33/60* (2006.01)
- *G01L 5/00* (2006.01)
- *B21K 1/76* (2006.01)

(52) U.S. Cl. ..................... 384/512; 384/504; 384/523; 73/862.01

(58) Field of Classification Search ............... 384/504, 384/494, 512–516, 523, 526–528, 544, 517; 74/424; 29/898.06, 898.07, 898.061, 898.064, 29/898.09; 73/593, 862.01, 863.38

See application file for complete search history.

(56) References Cited

U.S. PATENT DOCUMENTS

| 1,325,113 | A | * | 12/1919 | Rohn | ........................ 384/512 |
| 4,699,527 | A | * | 10/1987 | Hutzel | ........................ 384/510 |
| 4,723,851 | A | * | 2/1988 | Troster et al. | ............... 384/523 |
| 5,263,372 | A | * | 11/1993 | Matsuzaki et al. | ............ 73/593 |
| 5,517,858 | A | * | 5/1996 | Matsuzaki et al. | ............ 73/593 |
| 5,795,037 | A | * | 8/1998 | Hagelthorn | .............. 301/105.1 |
| 5,877,433 | A | * | 3/1999 | Matsuzaki et al. | ..... 73/862.381 |
| 6,446,339 | B2 | * | 9/2002 | Takamizawa et al. | .... 29/898.09 |
| 6,715,923 | B2 | * | 4/2004 | Miyazaki et al. | ........... 384/500 |
| 6,957,919 | B2 | * | 10/2005 | Kern et al. | .................. 384/526 |

(Continued)

FOREIGN PATENT DOCUMENTS

DE          497760          *   4/1930

(Continued)

*Primary Examiner*—Marcus Charles
(74) *Attorney, Agent, or Firm*—Jordan and Hamburg LLP

(57) ABSTRACT

To provide a oblique contact double ball bearing and a pre-load adding method for the ball bearing capable of easily adding the pre-load by performing adjustment for adding the pre-load in a wide adjustment range. In this oblique contact double ball bearing, clearances between balls and raceways and on one row are made different from clearances between balls and raceways on the other row so as to apply a thrust load to inner and outer rings, and add the pre-load to the inner and outer rings.

1 Claim, 4 Drawing Sheets

U.S. PATENT DOCUMENTS

| | | | |
|---|---|---|---|
| 7,059,777 B2 * | 6/2006 | Kawaguchi et al. | 384/504 |
| 2004/0022469 A1 * | 2/2004 | Ozawa et al. | 384/544 |
| 2004/0161183 A1 * | 8/2004 | Miyazaki et al. | 384/504 |
| 2004/0173042 A1 | 9/2004 | Jacob et al. | |
| 2004/0213493 A1 * | 10/2004 | Takamizawa et al. | 384/450 |
| 2005/0220383 A1 * | 10/2005 | Yokota et al. | 384/523 |

FOREIGN PATENT DOCUMENTS

| | | | |
|---|---|---|---|
| EP | 1403538 A1 | * | 3/2004 |
| GB | 206606 | * | 11/1923 |
| JP | 5-66328 | | 9/1993 |
| JP | 2002-523710 | | 7/2002 |
| JP | 2002327738 A | * | 11/2002 |
| JP | 2003-156128 | | 5/2003 |
| JP | 2003-314541 | | 11/2003 |
| WO | WO-03/089798 | | 10/2003 |

* cited by examiner

OBLIQUE CONTACT DOUBLE ROW BALL BEARING AND METHOD OF IMPARTING PRELOAD IN THE BALL BEARING

FIELD OF THE INVENTION

The present invention relates to an oblique contact double row ball bearing for supporting a pinion shaft of a differential device additionally provided in a vehicle or the like under a free rotation, more specifically to an oblique contact double row ball bearing in which pitch circle diameters of double rows are different to each other, in other words, raceway diameters of the double rows are different to each other, and a method of imparting a preload to the ball bearing.

BACKGROUND OF THE INVENTION

A tapered roller bearing is used as a roller bearing for supporting a pinion shaft of a differential device additionally provided in a vehicle, or the like under a free rotation. The tapered roller bearing has a large load capacity, however, its rotation torque is large. Therefore, an oblique contact ball bearing (angular contact ball bearing) may be incorporated into the differential device or the like in place of the tapered roller bearing (for example, see the Patent Document 1), or an oblique contact double row ball bearing called a tandem double row ball bearing in which pitch circle diameters of double rows are different to each other, in other words, raceway diameters of the double rows are different to each other, may occasionally be incorporated into the differential device or the like.

The oblique contact double row ball bearing having the pitch circle diameters different to each other is effectively used particularly for the opinion shaft of the differential device or the like because the rotation torque thereof is smaller than that of the tapered roller bearing and the load capacity is sufficiently large.

In the case of incorporating these bearings into the differential device, the bearings are managed and stored in a state where a preload as prescribed is applied thereto.

Patent Document 1: No. 2003-156128 of the Japanese Patent Application Laid-Open

DISCLOSURE OF THE INVENTION

Problem to be Solved by the Invention

The preload is controlled (adjusted) in the bearing through the measurement of the rotation torque of the bearing. Therefore, a range where the preload is set is increased as the rotation torque is larger, which facilitates the adjustment. As described earlier, the tapered roller bearing is advantageous in its large load capacity and at the same time the rotation torque thereof is large. As a result, the adjustment range of the preload to be set with respect to the bearing is large, which makes it easy to control the preload. However, in the oblique contact ball bearing, which has the structure of the ball bearing, the rotation torque is small and the adjustment range of the preload to be set with respect to the bearing is thereby reduced. As a result, it is difficult for the preload to be set with a high accuracy.

A main object of the present invention is to facilitate the control of the preload in the oblique contact ball bearing.

Means for Solving the Problem

In order to achieve the foregoing object, an oblique contact double row ball bearing according to the present invention comprises double rows of balls axially interposed in raceways of inner and outer rings, wherein an inner clearance between the balls in one of the rows and the raceway in which the balls are rolled, and an inner clearance between the balls in the other row and the raceway in which the balls are rolled are different to each other.

In a method of imparting a preload to the oblique contact double row ball bearing according to the present invention, the inner clearance between the balls in one of the rows and the raceway of the inner and outer rings corresponding to the one of the rows in which the balls are rolled, and the inner clearance between the balls in the other row and the raceway of the inner and outer rings corresponding to the other row in which the balls are rolled, are set to be different to each other, and then a load is given to the inner and outer rings so that the inner clearances are sequentially reduced in order to provide the preload to the inner and outer rings.

In the oblique contact double row ball bearing according to the present invention, any one of the clearances may be reduced earlier than the other.

The preload to be imparted to the bearing is generally obtained through measurement of a rotation torque. The case of imparting the preload to the oblique contact double row ball bearing is considered here. In this case, when a thrust load S to be imparted to the inner and outer rings is hypothetically a "S2" value, comparison of an adjustment range "T1" of a rotation torque T in a conventional oblique contact double row ball bearing to an adjustment range "T2" of the rotation torque T in the oblique contact double row ball bearing according to the present invention, which correspond to the "S2" value, it becomes T2>T1. Therefore, when it is tried to obtain the same preload, the preload can be adjusted in the range wider in the oblique contact ball bearing according to the present invention than that of the conventional oblique contact ball bearing, which consequently makes it easy to impart the preload with a high accuracy.

In addition, the preload may be set while the thrust load "S2" is being adjusted in the range of [S1]-[S3] in view of its tolerance in setting the preload. Such a case is considered. Comparing an adjustment range [T3] of the rotation torque T in the conventional bearing to an adjustment range [T4] of the rotation torque T in the bearing according to the present invention, T4>T3 is obtained. When it is tried to obtain the same preload, the adjustment range of the rotation torque T (in other words, adjustment range of the preload) is increased in the bearing according to the present invention in comparison to that of the conventional bearing. As a result, the preload can be easily and accurately imparted.

Effect of the Invention

According to the present invention, the preload can be adjusted in the adjustment range wider than that of the conventional oblique contact bearing by making the rotation torque large, and the preload can be thereby accurately and easily imparted.

Figure 1:
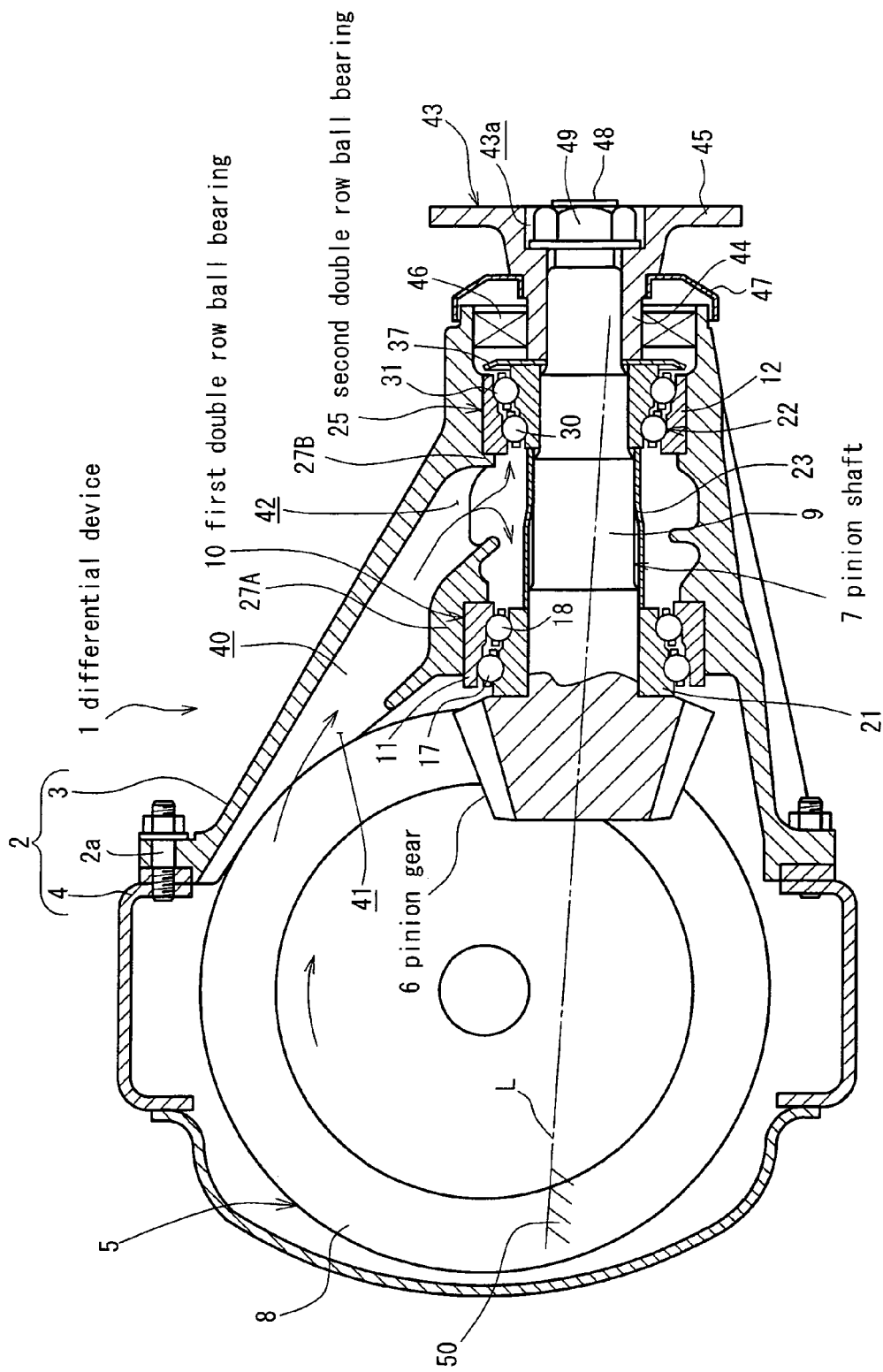
FIG. 1 is a sectional view illustrating a schematic constitution of a differential device according to a preferred embodiment of the present invention.

DESCRIPTION OF REFERENCE SYMBOLS 1 differential device
2 differential case
6 pinion gear
7 pinion shaft
10 first double row ball bearing
25 second double row ball bearing
11 first outer ring
21 first assembly component
13 first inner ring
12 second outer ring
22 second assembly component
14 second inner ring
28,29 row of balls
30,31 balls

PREFERRED EMBODIMENT OF THE PRESENT INVENTION

Figure 2:
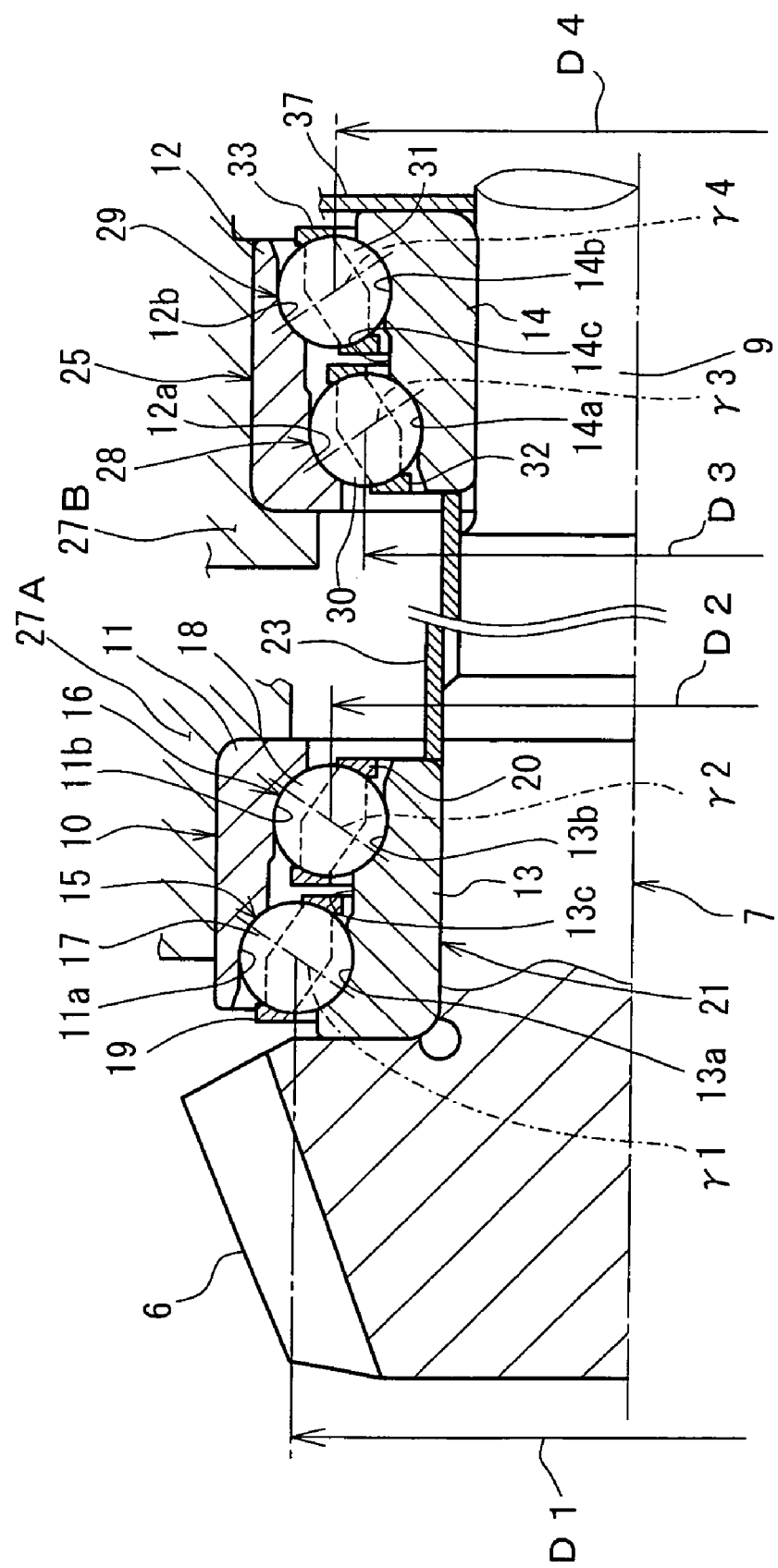
FIG. 2 is a sectional view in which double row ball bearings in the differential device are enlarged.

A preferred embodiment of the present invention is described referring to the drawings. FIG. 1 is a sectional view illustrating a schematic constitution of a differential device. FIG. 2 is a sectional view in which double row ball bearings are enlarged.

As shown in FIG. 1, a differential device 1 comprises a differential case 2. The differential case 2 comprises a front case 3 and a rear case 4. These cases 3 and 4 are coupled to each other by a bolt/nut 2a so as to thereby be integrated. Annular walls 27A and 27B in which ball bearings are applied are formed in the front case 3.

The differential case 2 comprises internally a differential speed-change mechanism 5 for differentially gearing right and left wheels, and a pinion shaft (drive pinion) 7 having a pinion gear 6 on one side thereof. The pinion gear 6 is meshed with a ring gear 8 of the differential speed-change mechanism 5. A shaft part 9 of the pinion shaft 7 is formed in a stepwise shape so that a diameter thereof is gradually reduced on the other side than one side thereof.

The one side of the shaft part 9 of the pinion shaft 7 is supported by the annular wall 27A of the front case 3 so as to freely rotate around an axial center via a first double row ball bearing 10. The other side of the shaft part 9 of the pinion shaft 7 is supported by the annular wall 27B of the front case 3 so as to freely rotate around the axial center via a second double row ball bearing 25.

As shown in FIG. 2, the first double row ball bearing 10 is an oblique contact double row ball bearing, and comprises a single first outer ring 11 fitted to an inner peripheral surface of the annular wall 27A and a first assembly component 21. The first assembly component 21 is assembled into the first outer ring 11 from the pinion-gear side toward the opposite side of the pinion gear 6 (hereinafter, referred to as counter-pinion-gear side) along an axial direction so as to thereby constitute the first double row ball bearing 10.

The first outer ring 11 has a structure of a counterbored outer ring. More specifically, the first outer ring 11 comprises a large diameter outer ring raceway 11a on the pinion-gear side and a small diameter outer ring raceway 11b on the counter-pinion-gear side. A planar part 11c is formed between the large diameter outer ring raceway 11a and the small diameter outer ring raceway 11b. The planar part 11c has a diameter larger than that of the small diameter outer ring raceway 11b and continuous to the large diameter outer ring raceway 11a. An inner peripheral surface of the first outer ring 11 is thus formed in the stepwise shape.

The first assembly component 21 comprises a single first inner ring 13, a large-diameter-side row of balls 15, a small-diameter-side row of balls 16, and retainers 19 and 20. The first inner ring 13 has a structure of a counterbored inner ring. More specifically, the first inner ring 13 comprises a large diameter inner ring raceway 13a and a small diameter inner ring raceway 13b. The large diameter inner ring raceway 13a faces the large diameter outer ring raceway 11a in a radial direction. The small diameter inner ring raceway 13b faces the small diameter outer ring raceway 11b in a radial direction. A planar part 13c is formed between the large diameter inner ring raceway 13a and the small diameter inner ring raceway 13b. The planar part 13c has a diameter larger than that of the small diameter inner ring raceway 13b and continuous to the large diameter inner ring raceway 13a. An outer peripheral surface of the first inner ring 13 is thus formed in the stepwise shape.

The large-diameter-side row of balls 15 are fitted to place on the pinion-gear side, in other words, between the large diameter outer ring raceway 11a and the large diameter inner ring raceway 13a. The small-diameter-side row of balls 16 are fitted to place on the counter-pinion-gear side, in other words, between the small diameter outer ring raceway 11b and the small diameter inner ring raceway 13b.

In the first double row ball bearing 10, a contact angle of the row of balls 15 and a contact angle of the row of balls 16 have a same direction. In other words, a line of action γ1 in accordance with the contact angle of the row of balls 15 and a line of action γ2 in accordance with the contact angle of the row of balls 16 face each other in a such a direction that an angle θ1 (not shown) made by the lines of action γ1 and γ2 is 0° or an acute angle ($0° \leq θ1 \leq 90°$). Such a constitution is adopted so that a preload is imparted to the both rows of balls 15 and 16 in a same direction (in the present case, direction from the pinion-gear side toward the counter-pinion-gear side). Further, the lines of action γ1 and γ2 are tilted in such a direction that outer-diameter sides thereof are on the counter-pinion-gear side and inner-diameter sides thereof are on the pinion-gear side with respect to a thrust surface. To be brief, the lines of action γ1 and γ2 are tilted in the upper-right direction in FIG. 2 and FIG. 3. The retainers 19 and 20 retain balls 17 and 18 respectively constituting the rows of balls 15 and 16 at a position with circumferentially equal interval.

The pinion shaft 17 is inserted through the first inner ring 13, and an end surface of the first inner ring 13 abuts an end surface of the pinion gear 6 from the axial-center direction. The first inner ring 13 is sandwiched from the axial-center direction between the end surface of the pinion gear 6 and a plastic spacer 23 externally mounted on the shaft part 9 of the pinion shaft 7 at an intermediate position thereof for setting the preload.

In the first double row ball bearing 10, a diameter of the ball 17 in the large-diameter-side row of balls 15 and a diameter of the ball 18 in the small-diameter-side row of balls 16 are equal to each other, while pitch circle diameters D1 and D2 of the respective rows of balls 15 and 16 are different to each other. More specifically, the pitch circle diameter D1 of the large-diameter-side row of balls 15 is set to a value larger than that of the pitch circle diameter D2 of the small-diameter-side row of balls 16. As described, the first double row ball bearing 10 has a double row structure (rows of balls 15 and 16) in which the two rows of balls have the different pitch circle diameters D1 and D2 each other.

Figure 3:
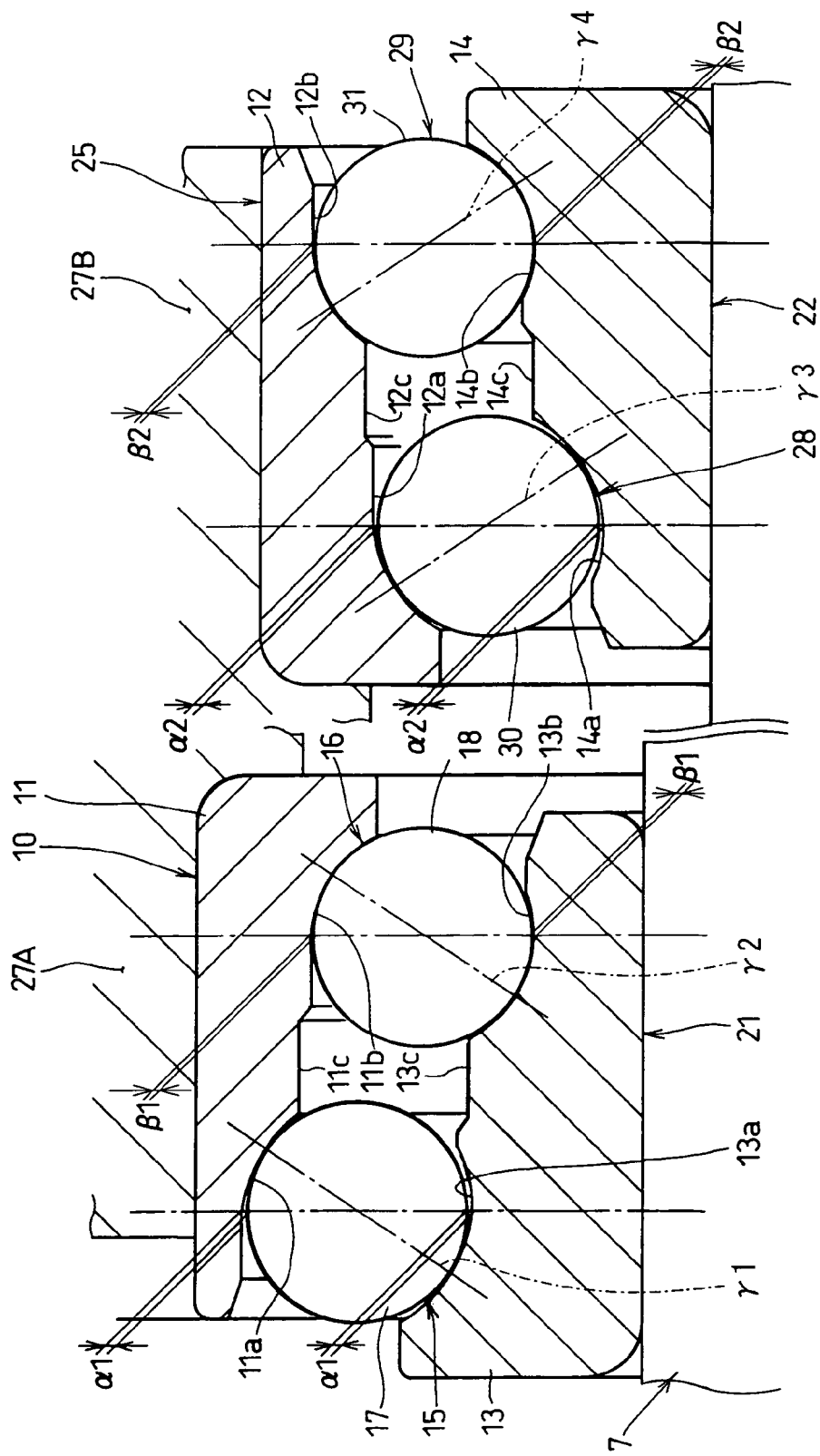
FIG. 3 is a sectional view in which the double row ball bearings are further enlarged.

As shown in an enlarged view of FIG. 3, the balls 17 of the large-diameter-side row of balls 15 are placed so as to space at a predetermined radial clearance α1 between the large diameter outer ring raceway 11a and the large diameter inner ring raceway 13a in an initial state before assembling into the differential device. The balls 18 of the small-diameter-side row of balls 16 are placed so as to space at a predetermined radial clearance β1 smaller than the radial clearance α1 (α1>β1) between the small diameter outer ring raceway 11b and the small diameter inner ring raceway 13b in the initial state before assembling into the differential device.

The second double row ball bearing 25 is an oblique contact double row ball bearing, and comprises a single second outer ring 12 fitted to an inner peripheral surface of the annular wall 27B and a second assembly component 22. The second assembly component 22 is assembled into the second outer ring 12 from the counter-pinion-gear side toward the pinion-gear side along the axial-center direction.

The second outer ring 12 has a structure of a counterbored outer ring. More specifically, the second outer ring 12 comprises a small diameter outer ring raceway 12a on the pinion-gear side and a large diameter outer ring raceway 12b on the counter-pinion-gear side. A planar part 12c is formed between the small diameter outer ring raceway 12a and the large diameter outer ring raceway 12b. The planar part 12c has a diameter larger than that of the small diameter outer ring raceway 12b and continuous to the large diameter outer ring raceway 12a. Accordingly, an inner peripheral surface of the second outer ring 12 is thus formed in the stepwise shape.

The second assembly component 22 comprises a single second inner ring 14, a small-diameter-side row of balls 28, a large-diameter-side row of balls 29, and retainers 32 and 33. The second inner ring 14 has a structure of a counterbored inner ring. More specifically, the second inner ring 14 comprises a small diameter inner ring raceway 14a and a large diameter inner ring raceway 14b. The small diameter inner ring raceway 14a faces the small diameter outer ring raceway 12a in a radial direction. The large diameter inner ring raceway 14b faces the large diameter outer ring raceway 12b in a radial direction. A planar part 14c is formed between the small diameter inner ring raceway 14a and the large diameter inner ring raceway 14b. The planar part 14c has a diameter smaller than that of the large diameter inner ring raceway 14b and continuous to the small diameter inner ring raceway 14a. An outer peripheral surface of the first inner ring 14 is thus formed in the stepwise shape.

The pinion shaft 7 is inserted through the second inner ring 14. The second inner ring 14 is sandwiched from the axial-center direction between the plastic spacer 23 for setting the preload and a shield 37.

The small-diameter-side row of balls 28 are placed to fit on the pinion-gear side, that is, between the small diameter outer ring raceway 12a and the small diameter inner ring raceway 14a. The large-diameter-side row of balls 29 are placed to fit on the counter-pinion-gear side, that is, between the large diameter outer ring raceway 12b and the large diameter inner ring raceway 14b.

In the second double row ball bearing 25, a contact angle of the row of balls 28 and a contact angle of the row of balls 29 have a same direction. In other words, a line of action γ3 in accordance with the contact angle of the row of balls 28 and a line of action γ4 in accordance with the contact angle of the row of balls 29 face each other in a such a direction that an angle θ2 (not shown) made by the lines of action γ3 and γ4 is 0° or an acute angle (0°≦θ2<90°). Such a constitution is adopted so that the preload is imparted to the both rows of balls 28 and 29 in a same direction (in the present case, direction from the counter-pinion-gear side toward the pinion-gear side). Further, the lines of action γ3 and γ4 are tilted in such a direction that outer-diameter sides thereof are on the pinion-gear side and inner-diameter sides thereof are on the counter-pinion-gear side with respect to the thrust surface. To be brief, the lines of action are tilted on the downside in FIGS. 2 and 3. The retainers 32 and 33 retain balls 30 and 31 respectively constituting the rows of balls 28 and 29 at a position with circumferentially equal intervals.

Thus, the inner-diameter sides of the lines of action γ1 and γ2 of the first double row ball bearing 10 are on the pinion-gear side with respect to the thrust surface, while the outer-diameter sides of the lines of action γ3 and γ4 of the second double row ball bearing 25 are on the pinion-gear side with respect to the thrust surface, so that the gradients of the lines of action in accordance with the contact angles of the bearings 10 and 25 are thereby reverse to each other. Such a constitution is adopted in order to reverse the directions where the preload is imparted in the bearings 10 and 25.

In the second double row ball bearing 25, a diameter of the ball 30 in the small-diameter-side row of balls 28 and a diameter of the ball 31 in the large-diameter-side row of balls 29 are equal to each other, while pitch circle diameters D3 and D4 of the respective rows of balls 28 and 29 are different to each other. More specifically, the pitch circle diameter D3 of the small-diameter-side row of balls 28 is set to a value smaller than that of the pitch circle diameter D4 of the large-diameter-side row of balls 29. As described, the second double row ball bearing 25 has a double row structure (rows of balls 28 and 29) in which the two rows of balls have the different pitch circle diameters D3 and D4 to each other.

As shown in an enlarged view of FIG. 3, the balls 30 of the small-diameter-side row of balls 28 are placed to space at a predetermined radial clearance α2 between the small diameter outer ring raceway 12a and the small diameter inner ring raceway 14a in the initial state before assembling into the differential device. The balls 31 of the large-diameter-side row of balls 29 are placed to space at a predetermined radial clearance β2 smaller than the radial clearance α2 (α2>β2) between the large diameter outer ring raceway 12b and the large diameter inner ring raceway 14b in the initial state before assembling into the differential device.

An oil-circulating path 40 is formed between an outer wall of the front case 3 and one side of the annular wall 27A. An oil inlet 41 of the oil circulating path 40 is opened toward a ring-gear-8 side of the oil circulating path 40, while an oil outlet 42 of the oil circulating path 40 is opened toward between the annular walls 27A and 27B.

The differential device 1 comprises a companion flange 43. The companion flange 43 comprises a barrel part 44 and a flange part 45 formed as united with the barrel part 44.

The barrel part 44 is externally mounted on the shaft part 9 of the pinion shaft 7 on the other side thereof, namely, on a drive-shaft side (not shown) thereof. The shield 37 is interposed between an end surface of the barrel part 44 and an end surface of the second inner ring 14 of the second double row ball bearing 25.

An oil seal 46 is arranged between an outer peripheral surface of the barrel part 44 and an inner peripheral surface of an opening of the front case 3 on the other side thereof. A seal protective cap 47 is attached to the other-side opening of the front case 3. The oil seal 46 is covered with the seal protective cap 47. A screw part 48 is formed at an end part of the shaft part 9 on the other side thereof. The screw part 48 is protruded into a central recess part 43a of the flange part 45. A nut 49 is screwed into the screw part 48 so that the first inner ring 13 of the first double row ball bearing 10 and the second inner ring 14 of the second double row ball bearing 25 are sandwiched between the end surface of the pinion gear 6 and an end surface of the companion flange 43 in the axial-center direction. A predetermined preload is imparted to the first double row ball bearing 10 and the second double row ball bearing 25 via the shield 37 and the plastic spacer 23.

In the differential device 1 thus constituted, a lubricating oil 50 is reserved in the differential case 2 at a predetermined level L in a state where the operation is halted. The lubricating oil 50 is raised upward by the rotation of the ring gear 8 when the operation starts, travels through the oil circulating path 40 in the front case 3, and is introduced and supplied to upper parts of the first double row ball bearing 10 and the second double row ball bearing 25. Thereby, the lubricating oil 50 circulates in the differential case 2 so as to lubricate the first double row ball bearing 10 and the second double row ball bearing 25.

Figure 4:
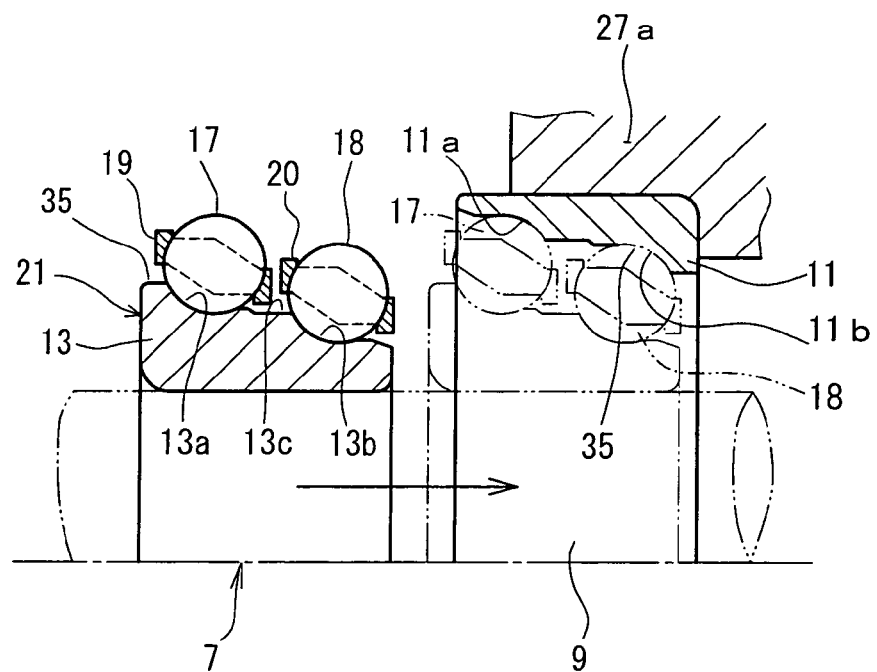
FIG. 4 is a sectional view illustrating a state where the double row ball bearings are being assembled.

Next, a method of assembling the differential device 1 is described referring to a partial sectional view of FIG. 4. In order to assemble the differential device 1, the first double row ball bearing 10 and the second double row ball bearing 25 are assembled in advance. Before the first double row ball bearing 10 is assembled, the radial clearance $\beta 1$ is adjusted to be smaller than the radial clearance $\beta 1$ as described earlier. More specifically, the respective parts of the first double row ball bearing 10 are formed so as to obtain the foregoing relationship between the clearances, and further, shapes of the respective parts are adjusted so that the clearances in the predetermined state can be obtained in the assembly.

Before the second double row ball bearing 25 is assembled, an clearance between the small-diameter-side row of balls 28, and the small diameter outer ring raceway 12a and the small diameter inner ring raceway 14a is adjusted so that the radial clearance $\beta 2$ is smaller than the radial clearance $\alpha 2$ as described earlier. More specifically, the respective parts of the second double row ball bearing 25 are formed so as to obtain the foregoing relationship between the clearances, and further, shapes of the respective parts are adjusted so that the clearance in the predetermined state can be obtained in the assembly.

After the foregoing adjustments and preparations are made, the first double row ball bearing 10 is disassembled into the first outer ring 11 and the first assembly component 21, and the second double row ball bearing 25 is disassembled into the second outer ring 12 and the second assembly component 22. Then, the first double row ball bearing 10 and the second double row ball bearing 25 are incorporated into the differential device 1. More specifically, the first outer ring 11 and the second outer ring 12 are respectively pressed into the annular walls 27A and 27B. More specifically, in a state where the front case 3 and the rear case 4 are still separated, the first outer ring 11 is incorporated into the front case 3 and further pressed in the axial-center direction from the one-side opening of the front case 3 until it abuts a step part formed on the annular wall 27A. Then, the second outer ring 12 is pressed in the axial-center direction from the other-side opening of the front case 3 until it abuts a step part formed on the annular wall 28B.

The first assembly component 21 (specifically, first inner ring 13) is inserted through the pinion shaft 7. Then, the first assembly component 21 is incorporated into the pinion shaft 7 so as to locate on the pinion-gear-6 side of the shaft part 9 of the pinion shaft 7.

The pinion shaft 7 into which the first assembly component 21 is incorporated is inserted through the one-side opening of the front case 3 from the small-diameter side thereof. At the time, the pinion shaft 7 is inserted so that the balls 18 of the small-diameter-side row of balls 16 of the first assembly component 21 are fitted into the small-diameter outer ring raceway 11b of the first outer ring 11. Further, the pinion shaft 7 is inserted so that the balls 17 of the large-diameter-side row of balls 15 are fitted into the large-diameter outer ring raceway 11a of the first outer ring 11. In order to realize the assembly process described above, the small-diameter-side row of balls 16 is arranged to be closer to a rear side in the direction where the pinion shaft 7 is inserted (the counter-pinion-gear side) than the large-diameter-side row of balls 15.

Next, the plastic spacer 23 is inserted by externally fitting to the shaft part 9 of the pinion shaft 7 from the other-side opening of the front case 3. Subsequently, the second assembly component 22 (specifically, second inner ring 14) is inserted by externally fitting to the shaft part 9 of the pinion shaft 7 from the other-side opening of the front case 3. In order to realize the foregoing insertion by externally fitting, the small-diameter-side row of balls 28 is arranged to be closer to a rear side in the direction where the pinion shaft 7 is inserted (pinion-gear side) than the large-diameter-side row of balls 29.

Thereafter, the shield 37 is inserted through the shaft part 9 of the pinion shaft 7 from the other-side opening of the front case 3. Further, the oil seal 46 is fixed on the shaft part 9 of the pinion shaft 7 from the other-side opening of the front case 3. The seal protective cap 47 is mounted on the other-side opening of the front case 3. The barrel part 44 of the companion flange 43 is inserted through the seal protective cap 47 so that the end surface of the barrel part 44 abuts the shield 37. Then, the nut 49 is screwed into the screw part 48. Thereby, a thrust load is imparted to the first double row ball bearing 10 and the second double row ball bearing 25, and a predetermined preload is imparted thereto. The direction to impart the preload id done as below. The preload is imparted to the first double row ball bearing 10 along the direction from the pinion-gear side toward the counter-pinion-gear side, while the preload is imparted to the second double row ball bearing 25 along the direction from the counter-pinion-gear side toward the pinion-gear side. Thus, the preload is imparted to the first and second double row ball bearings 10 and 25 in the reverse directions.

In the differential device 1, the radial clearance $\beta 1$ is set to a value smaller than that of the radial clearance $\alpha 1$. Therefore, when the thrust load for imparting the preload is applied to the first double row ball bearing 10, the balls 18 of the small-diameter-side row of balls 16 are fitted into the raceways 11b and 13b at the predetermined contact angle before the balls 17 of the large-diameter-side row of balls 15 are fitted into the raceways 11b and 13b, and thereby the rotation torque is generated.

In the same way, in the differential device 1, the radial clearance $\beta 2$ is set to a value smaller than that of the radial clearance $\alpha 2$ in a similar manner. Therefore, when the thrust load for imparting the preload is applied to the second double row ball bearing 25, the balls 31 of the large-diameter-side row of balls 29 are fitted into the raceways 12b and 14b at the predetermined contact angle before the balls 30 of the small-diameter-side row of balls 28 are fitted into the raceways 12a and 14a, and thereby the rotation torque is generated.

In the first double row ball bearing 10 and the second double row ball bearing 25, the initial rotation torques are obtained as described, and the larger thrust load which is further applied so that the preload at a necessary level is applied. Explanation is given below.

In the state where the initial rotation torques are generated, as described, the radial clearance $\beta 1$, that is on the side of the smaller clearance, is reduced, and the balls 18 of the smalldiameter-side row of balls 16, the small diameter outer ring raceway 11b and the small diameter inner ring raceway 13b are thereby already fitted with respect to one another at the predetermined contact angle in the first double row ball bearing 10, while the radial clearance β2, that is on the side of the smaller clearance, is reduced so that the balls 31 of the large-diameter-side row of balls 29 and the raceways 12b and 14b are fitted with respect to one another at the predetermined contact angle in the second double row ball bearing 25.

When the thrust load is further imparted to the first double row ball bearing 10 and the second double row ball bearing 25 in the described state, the radial clearance α1, that is on the side of the larger clearance, is reduced so that the balls 17 of the large-diameter-side row of balls 15 and the raceways 11a and 13a are fitted with respect to one another at the predetermined contact angle in the first double row ball bearing 10, and thereby the rotation torque is generated. In a similar manner, the radial clearance α2, that is on the side of the larger clearance, is reduced so that the balls 30 of the small-diameter-side row of balls 28 and the raceways 12a and 14a are fitted with respect to one another at the predetermined contact angle in the second double row ball bearing 25, and thereby the rotation torque is generated.

By slightly shifting the fitting timing in the respective rows of balls as described, the rotation torque is selectively obtained in the row of balls 16 alone in the first double row ball bearing 10, and thereafter the rotation torque resulting from the synthesized rotation torques of the rows of balls 15 and 16 is obtained with a time lag. In a similar manner, in the second double row ball bearing 25, the rotation torque is selectively obtained in the row of balls 29 alone, and thereafter the rotation torque resulting from the synthesized rotation torques of the rows of balls 28 and 29 is obtained with a time lag. Accordingly, a maximum rotation torque thereby obtained is increased, which expands the range of the adjustable torque. The adjustment range of the preload to be set is thereby increased, and the preload control is consequently facilitated.

A graph of FIG. 4 shows a relationship between the thrust load S (preload) imparted to the oblique contact double row ball bearing and the rotation torque T corresponding to the thrust load S. The thrust load applied to the oblique contact double row ball bearing can be known through the measurement of the rotation torque T.

In the drawing, a broken line 60 shows a result of the conventional oblique contact double row ball bearing (double row ball bearing in which the pitch circle diameters of the respective rows are different to each other), while a solid line 61 shows a result of the first and second oblique contact double row ball bearings 10 and 25 according to the present invention (oblique contact double row ball bearings in which the pitch circle diameters of the respective rows are different to each other). Comparing a tilt of the broken line 60 to that of the solid line 61 to each other, the tilt of the solid line 61 is larger than that of the broken line 60. A reason is described below.

As described, in the first double row ball bearing 10, the balls 18 of the small-diameter-side row of balls 16 and the raceways 11b and 13b are first fitted with respect to one another so that the initial rotation torque is generated, and thereafter, the balls 17 of the large-diameter-side row of balls 15 and the raceways 11a and 13a are fitted with respect to one another so that the rotation torque is further generated.

In a similar manner, in the second double row ball bearing 25, the balls 31 of the large-diameter-side row of balls 29 and the raceways 12b and 14b are first fitted with respect to one another so that the initial rotation torque is generated, and thereafter, the balls 30 of the small-diameter-side row of balls 28 and the raceways 12a and 14a are fitted with respect to one another so that the rotation torque is further generated.

As a result, the rotation torque can be largely set and the range of the torque to be set can be increased in comparison to the conventional oblique contact double row ball bearing in which the balls of the both rows are simultaneously fitted into the raceways, and the gradient of the full line 61 is larger than that of the broken line 60.

Figure 5:
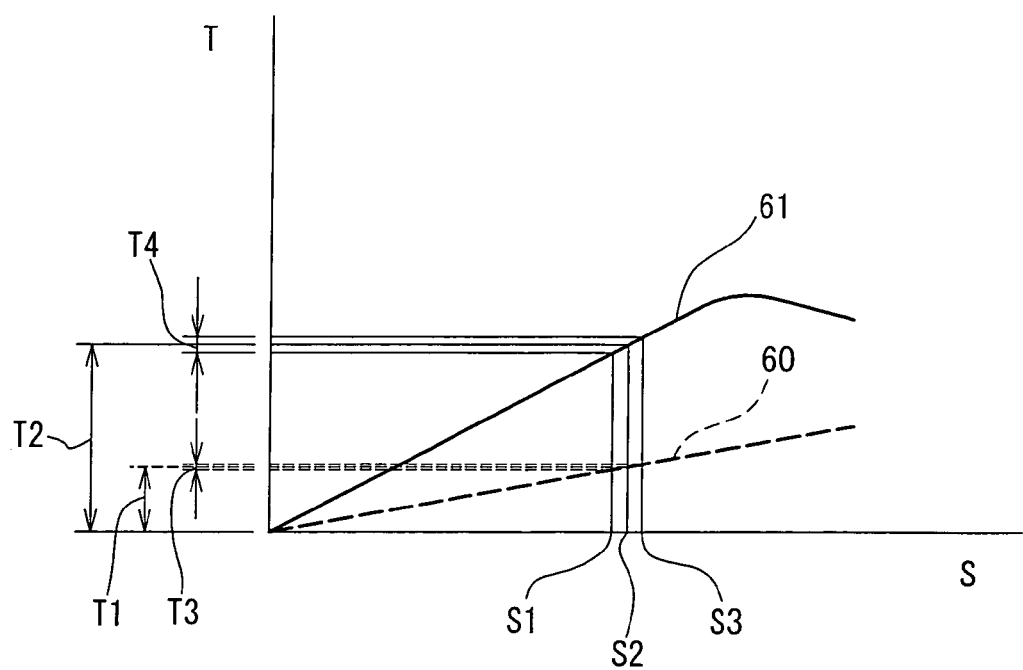
FIG. 5 is a graph showing a relationship between a thrust load and a rotation torque.

Description is given here, for example, to a case where it is tried to obtain the "S2" value as the thrust load S referring to a graph shown in FIG. 5. Because the tilt of the solid line 61 is larger than that of the broken line 60, the adjustment range of the rotation torque T corresponding to the "S2" value is T1 in the broken line 60 (conventional example), while the adjustment rage of the rotation torque T is T2 in the first and second double row ball bearings 10 and 25 according to the present invention, that is, it is T2>T1. Therefore, when the thrust load S2 is applied so that the same preload is obtained, the range for the adjustment is larger in the first and second double row ball bearings 10 and 25 according to the present invention than in the conventional oblique contact double row ball bearing. As a result, the preload can be accurately and easily applied.

Consideration is done about a case where the thrust load "S2" to be imparted is in the range from "S1" through "S3" in terms of its tolerance. In this case, the adjustment range of the rotation torque T in the conventional oblique contact double row ball bearing is T3, while the adjustment range of the rotation torque T is T4 in the first and second double row ball bearings 10 and 25 according to the present invention, that is, it is T4>T3 as shown in FIG. 5. Thus, even in this case, the first and second double row ball bearings 10 and 25 according to the present invention can achieve the adjustment range wider than that of the conventional double row ball bearing when it is tried to obtain the same preload. As a result, the thrust load S (preload) can be accurately and easily applied.

What is claimed is:

1. A method of imparting a preload to first and second ball bearings, which are each an oblique contact double row ball bearing, and said first and second ball bearings are axially arranged to have preload applied simultaneously thereto, the method comprising:

providing said first ball bearing with first bearing first and second rows of balls wherein said first bearing first row of balls have a first bearing first pitch diameter and a first radial clearance α1, and said first bearing second row of balls have a first bearing second pitch diameter and a second radial clearance β1, wherein said first bearing first pitch diameter is greater than said first bearing second pitch diameter and said first radial clearance α1 is greater than said second radial clearance β1;

providing said second ball bearing with second bearing first and second rows of balls wherein said second bearing first row of balls have a second bearing first pitch diameter and a first radial clearance α2, and said second bearing second row of balls have a second bearing second pitch diameter and a second radial clearance β2, wherein said second bearing first pitch diameter is less than said second bearing second pitch diameter and said first radial clearance α2 is greater than said second radial clearance β2;

arranging said first and second ball bearings on a common shaft to disposed sequentially said first bearing first row of balls, said first bearing second row of balls, said second bearing first row of balls, and said second bearing second row of balls;

rotating said common shaft;

measuring a rotation torque of said shaft;

applying and increasing preload to said first and second bearings while measuring said rotation torque until a measured rotation torque enters a predetermined range such that:

inner and outer raceways of said first bearing second row of balls are first fitted to said first bearing second row of balls to generate rotation torque and subsequently inner and outer raceways of said first bearing first row of balls are then fitted to said first bearing first row of balls to generate further rotation torque; and inner and outer raceways of said second bearing second row of balls are first fitted to said second bearing second row of balls to generate rotation torque and subsequently inner and outer raceways of said second bearing first row of balls are then fitted to said second bearing first row of balls to generate further rotation torque.

\* \* \* \* \*